United States Patent [19]
Clark et al.

[11] 3,949,364
[45] Apr. 6, 1976

[54] AUTOMATIC REMOTE BANKING SYSTEM AND EQUIPMENT

[75] Inventors: Robert W. Clark, Canton; Robert P. Barone; Donald E. Kinker, both of North Canton, all of Ohio

[73] Assignee: Diebold, Incorporated, Canton, Ohio

[22] Filed: Aug. 2, 1974

[21] Appl. No.: 494,231

Related U.S. Application Data

[63] Continuation-in-part of Ser. No. 269,868, July 7, 1972, abandoned.

[52] U.S. Cl. ...... 340/147 A; 235/61.7 B; 340/149 A
[51] Int. Cl.[2] ...................... H04Q 9/00; G06R 7/01
[58] Field of Search......... 243/2; 340/147 A, 152 R, 340/149 R, 149 A; 186/1 R, 1 A, 1 B

[56] References Cited
UNITED STATES PATENTS

| | | | |
|---|---|---|---|
| 2,912,066 | 11/1966 | Ellithorpe | 243/2 X |
| 3,294,342 | 12/1966 | McClure et al. | 243/2 |
| 3,407,387 | 10/1968 | Looschen et al. | 340/152 R |
| 3,588,449 | 6/1971 | Paterson | 340/149 A X |
| 3,648,020 | 3/1972 | Tateisi et al. | 340/149 A X |
| 3,662,343 | 5/1972 | Goldstein et al. | 340/149 A |
| 3,705,384 | 12/1972 | Wahlberg | 340/149 A |

*Primary Examiner*—Donald J. Yusko
*Attorney, Agent, or Firm*—Frease & Bishop

[57] ABSTRACT

A banking system, equipment and operations are provided which dispense cash at an unmanned station from a money vault unit at a remote station to a customer who verifies his identity at the unmanned station. The system and equipment also may accept deposits from the customer at the unmanned station and convey the deposits to a depository unit at the remote station. The unmanned station may be combined in a bank drive-up or walk-up service unit served by a teller located at either the unmanned or the remote station during business hours. The automatic equipment at the unmanned station and the money vault and depository units at the remote station provide maximum security for money or articles handled. Along with this security feature, the automatic equipment does not require the presence of a teller to provide banking services for customers during non-business hours.

6 Claims, 6 Drawing Figures

AUTOMATIC REMOTE BANKING SYSTEM AND EQUIPMENT

CROSS-REFERENCE TO RELATED APPLICATION

This application is a Continuation-in-Part of our co-pending application entitled AUTOMATIC REMOTE BANKING SYSTEM AND EQUIPMENT, filed July 7, 1972, Ser. No. 269,868 and abandoned.

BACKGROUND OF THE INVENTION

1. Field of the Invention

The invention relates to systems, equipment and operations providing both manual and automatic banking services at drive-up or walk-up bank service units, and more particularly to systems, equipment and operations by which one or more customer stations remote from one of a bank's central control facilities may provide banking services to dispense cash or accept deposits, either manually with the help of a teller, or automatically in the absence of any bank personnel.

The equipment permits a customer to carry out financial transactions at a customer station remote from a central control facility of a bank, with the help of banking personnel, or automatically with no bank personnel in attendance. Finally, the invention relates to such manually or automatically operated banking systems, equipment and operations which provide maximum protection for money or articles handled, by locating the money to be dispensed or the articles that have been deposited at all times at a central control facility of a bank remote from one or more customer service units served by the central facility, and where money is dispensed to a customer or deposits received from a customer.

2. Description of the Prior Art

Drive-up or walk-up customer service unit stations have been used, controlled manually by teller attendance within a central bank facility, or at a teller station remote from its central facility to enable a customer to engage in banking transactions at a remote drive-up or walk-up banking service station. Money and papers are conveyed between teller and customer through pneumatic tube conveyors. Communication is provided audibly through intercoms, and visually either directly or through television. Such equipment requires the attendance of a teller at the central facility or at a teller station, to manually assist in providing the banking services performed.

Prior equipment of such types has the advantage of providing maximum protection for the cash, money, checks, papers or other articles involved in the transactions, since, when initially dispensed or finally received, they are located and stored at the bank facility or teller's station, excepting during conveyance through the pneumatic tube system to or from the customer. However, such systems, equipment and operations essentially are manually performed and require the attendance of a teller. Thus, such banking services only can be provided with the described equipment during normal banking hours when tellers are available.

Other types of banking service systems, equipment and operations have avoided the manual operation and teller attendance difficulties at the expense, however, of security. Thus, unmanned cash dispensers at remote stations are used to store a supply of cash or money. Units of money are dispensed to a customer from the supply at the remote cash dispenser station after the customer has established his identity and has been cleared for the requested bank service.

These prior remotely located cash dispensers, however, require the storage of a supply of cash to be maintained at all times at each of the remote stations; and require the services of traveling personnel to inspect and service the remote station components and to replenish the money supplies frequently at each of the remote stations. Safeguarding the personnel replenishing the cash supplies, or protecting the cash supplies themselves, or guarding the personnel servicing the equipment at many remote stations is difficult and costly.

There exists a need in the field of banking services for unmanned customer service facilities remote from main banking buildings but available at all times to customers establishing authorized identity, while providing maximum security at minimum cost at all times for the stored money involved in the transactions to be carried out at any unmanned remote customer station.

SUMMARY OF THE INVENTION

Objectives of the invention include providing new banking systems, equipment and operations, which enable banking services to be transacted at unmanned, remotely located customer stations, and which protect the stored money involved in the transactions at a remote bank central control station at all times, except when being conveyed to or from the unmanned remote customer station; providing for such automatic unmanned banking services in conjunction or combined with manually operated equipment at the remote customer station, so that the equipment, selectively, may be manually or automatically operated; providing new banking service systems, equipment and operations which permit a customer to engage in financial transactions either with or without the help of bank personnel; and providing new banking service systems, equipment and operations which achieve the stated objectives in a safe, effective, efficient and inexpensive manner, and which solve problems and satisfy needs existing in the banking field.

These and other objects and advantages may be obtained by the new banking service systems, equipment and operations, the general nature of which may be stated as including in remote banking equipment of a type which includes a customer station and a remote bank control station; in which the customer station has keyboard means, card reader means, and message panel means; in which the customer and control stations are connected by a pneumatic tube system having a dispenser terminal at the customer station and a control terminal at the control station; and in which a customer may enter predetermined data and material into the keyboard and card reader, and upon verified identification may receive money dispensed at the customer station dispenser terminal; the combination of money vault means at the control station containing and storing a supply of money, a carrier movable in the pneumatic tube system between the control and dispenser terminals; conveyor means communicating between the money vault means and control terminal for transferring selected amounts of money from the money supply to a carrier located at the control terminal; switch means at the control station movable to energize the customer and control stations for automatic unmanned operation; controller means actuating the money vault means to deliver a selected amount of money to the conveyor means upon verified customer identification and entry of predetermined data at the customer station keyboard and card reader in accordance with instructions at the message panel means; said controller means thereafter actuating the conveyor means and carrier to transfer the money from the conveyor means to the carrier, and then to move the carrier from the control terminal to the dispenser terminal at the customer station.

BRIEF DESCRIPTION OF THE DRAWINGS

Preferred embodiments of the invention - illustrative of the best modes in which applicants have contemplated applying the principles - are set forth in the following description and shown in the drawings and are particularly and distinctly pointed out and set forth in the appended claims.

Similar numerals refer to similar parts throughout the various figures of the drawings.

DESCRIPTION OF THE PREFERRED EMBODIMENTS

First Embodiment

Figure 1:
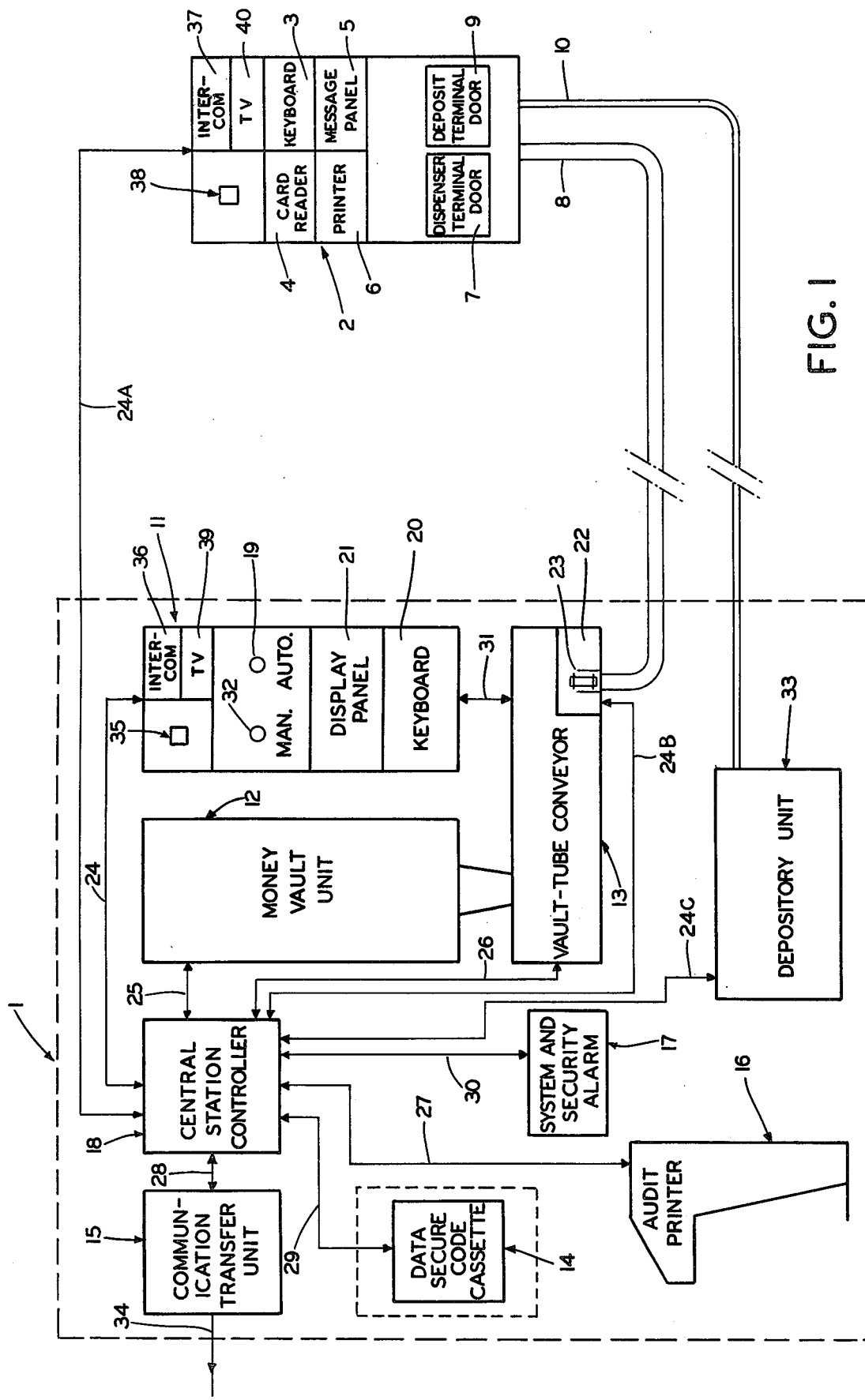
FIG. 1 is a block diagram illustrating the new banking service systems and operations, and diagrammatically illustrating one arrangement of the new equipment.

One of a bank's central control facilities is indicated generally within the rectangle 1 outlined in dash lines in FIG. 1. The facility may be housed in a bank building, which may be a main or a branch bank building. The building is located at a remote location with respect to the unmanned customer station, indicated generally at 2, where it is desired to provide banking services for customers without the attendance of bank personnel, so that an authorized customer may engage in banking transactions at the unmanned station 2, at any time, 24-hours-a-day, seven days a week.

The unmanned station 2 has components comprising the keyboard 3, the card reader 4, the message panel 5, and the printer 6. The station 2 also is equipped with a pneumatic tube dispenser terminal having an access door 7 for access to a dispenser carrier delivered to the station 2 through a pneumatic dispenser tube 8.

The station 2 also may be provided with a deposit terminal having an access door 9 through which a deposit carrier may be entered for movement into and through a pneumatic deposit tube 10.

The keyboard 3, is provided to enable a customer or user to enter a personal identification number, to select an account to be debited or credited with the transaction, and to enter other data pertinent to the transaction. The keyboard 3 preferably provides for entering both numbers and letters, sometimes called the entry of alpha-numeric data; and is used in conjunction with the message panel 5 to permit communication between the machine and the customer. Such communication between the user and equipment may be termed a conversational mode of man-machine communication.

The card reader 4 is provided to permit a customer or user to insert or enter a coded card or other coded means into the unmanned station 2. The coded card may be any one of usual types of credit cards issued by or processed through banks. The card may be encoded by any or all of many techniques that have been used, such as magnetic stripe encoding, embossing, embedded materials, holes, and relative opacity of portions of the card. Such cards usually are of wallet size. However, the card presented to the card reader 4 may be a special encoded card issued by the particular bank owning and servicing the unmanned station 2.

Such cards, regardless of the type, preferably will contain all pertinent information applicable to any transaction to be carried out by the customer or user; such as, the customer's account number, the bank routing number, permissible limitation as to the amount of money to be obtained on any transaction, security data to guard against fraudulent cards, etc. Such card information, as stated, is encoded in whole or in part in or on the card, and the coded and other data contained in or on any card is read from or used as required in performing the banking transaction.

The message panel 5 is provided and used as a means of giving instructions to the customer or user, that is, to provide man-machine communication between the equipment and the customer. This may be termed "man-machine interface." Messages in words or figures or combinations thereof (alpha-numeric) are displayed at the message panel 5 so as to be visible to the user. The messages may be used along with the keyboard 3 to provide communication between the machine and the user so as to assure that the proper sequence of operations is carried out. The message panel 5 also may be used to give pertinent information to the user, such as "Machine Empty," "Out of Service," "Power Failure," and other similar messages.

The printer 6 is provided to prepare printed records of data concerning all transactions. These printed records preferably are printed on a tape contained within the printer unit 6. The printing of records also may include a printing of a receipt or record of a completed transaction, whether a withdrawal, deposit, fund transfer, or the like, which receipt is issued to the user.

The deposit terminal door 9 is provided to permit a customer to make after-hour deposits of documents, cash or other articles. The deposited material upon opening door 9 is delivered to and transferred through a pneumatic tube 10 to a remote depository unit, later to be described.

Operation and use of the described components of the unmanned customer station 2 are coordinated with and controlled by other components of the system located at the remote central control facility station 1. The equipment components at control station 1 include the teller station generally indicated at 11, the money vault unit 12, the vault-tube conveyor 13, the data secure code cassette 14, the communication transfer unit 15, preferably an audit printer 16, the system and security alarm means 17, and the central station controller 18.

The teller station 11, for automatic operation of the equipment, is equipped with switch means such as automatic operation button 19, which is actuated to energize the unmanned station 2 and the system for automatic operation. Teller station 11 also is equipped with a keyboard unit 20, and a teller message display panel 21 for man-machine communications display, when the station 1 is equipped for manual as well as automatic operation.

The money vault unit 12 is essentially a vault or safe in which a store of money, either paper money or coin (usually paper money) is housed and may be stored in packs, containers, envelopes and the like, with a preselected amount in each pack or may be stored as loose money. The vault unit 12 has mechanism and controls which when actuated will deliver a user-selected amount of money from the cash stored in vault unit 12 to a conveyor receive station in the vault-tube conveyor 13. Thus, variable amounts of money, as selected by a user, through manual input to the keyboard 3 at the unmanned station 2, may be delivered to conveyor 13 at a receive station of the conveyor.

Vault-tube conveyor 13 and its conveyor receive station and conveyor means connect the vault unit 12 and a control terminal 22 for pneumatic dispenser tube 8. The conveyor 13 also may be entirely or partially housed in a secure enclosure. The predetermined amount of money selected by a user at unmanned station 2 and delivered by money vault 12 to conveyor 13 is delivered by the conveyor to a dispenser carrier 23 located at control terminal 22 and transferred into the carrier 23 indicated at the right end of conveyor 13 in FIG. 1, as described in detail below with respect to FIGS. 4, 5 and 6. Carrier 23 preferably is a captive carrier and may be of the type shown in U.S. Pat. No. 3,237,884 which may move in tube systems such as described in U.S. Pat. Nos. 3,232,559, 3,237,881, 3,237,882 and 3,237,933.

The data secure code cassette 14 is a memory unit provided for storing cryptographics to permit high security information to be protected during message transmission. Also, the cassette 14 may store the account numbers of invalid or illegal (hot cards) credit cards.

The communication transfer unit 15 is provided selectively, to communicate between the central control station 1 and a master control station located at the main banking headquarters, later described, and which also controls other central control stations 1. The unit 15 is an interface unit permitting data transfer to and from central station controller 18 to enable data transmission to and from a master control station. When a master control station is not integrated into the system, the unit 15 is equipped with a suitable memory device to store such data as user rate-of-use, account numbers, credit limit, transaction data, and other information which may be desired to facilitate operation of the system when not connected to a master control station.

The audit printer 16 is provided to permit printing records of data or transactions performed by the system which may be referred to as hard copy records. The audit printer 16 also contains a keyboard for manual entry into the system of data at any time, such as the addition of "hot card" numbers which frequently are entered daily. Where the central control station 1 is connected with a master control station located at the main banking headquarters, the audit printer 16 serves as a back-up unit, with respect to the particular station 1 at which printer 16 is located, for a similar printer at the master control station.

The system and security alarm means 17 may be a module provided to permit input reporting to the system of conventional alarm devices that may be installed at various locations with respect to the system and related components thereof, for the protection of vaults, premises, drive-up or walk-up stations, presonnel serving the system, etc.

The central station controller 18 for the central control station 1 may include a mini-computer and circuitry connected to the components of the system, and is the heart of the system in that all of the components at the unmanned customer station 2 and at the central control station 1 are under the control of central controller 18 through communication and control circuits.

Such control is indicated by the various lines of communication diagrammatically shown in FIG. 1 at the central control station 1 and arrows on the lines, including line 24 running both ways between controller 18 and the teller station 11, line 25 running both ways between the controller 18 and money vault 12, line 26 running both ways between controller 18 and vault-tube conveyor 13, line 27 running both ways between controller 18 and audit printer 16, line 28 running both ways between controller 18 and communication transfer unit 15, line 29 running both ways between data secure code cassette 14 and controller 18, line 30 extending from system and security alarm means 17 to controller 18, line 31 extending both ways between teller station 11 and vault-tube conveyor 13, line 24A extending both ways between controller 18 and unmanned station 2, line 24B extending both ways between controller 18 and control terminal 22, and line 24C extending both ways between controller 18 and depository unit 33.

Controller 18 also functions through its connections with money vault unit 12, vault-tube conveyor 13, teller station 11, remote unit 2, the control terminal 22, the depository unit 33, and through the systems energized by the automatic operation control button 19, and alternate manual control operation button 32, to control the various functions and operations of the components located at the unmanned station 2, the control terminal 22, and a depository unit 33 indicated at central station 1, connected by the pneumatic deposit tube 10 with the depository terminal 9 at the unmanned station 2.

The controller 18 checks, initiates, observes or monitors, and orients the operations and programming of operations of the described components of the system.

Line 34 represents communication, preferably through telephone lines, between the central control station 1 and a master control station, to be described in connection with FIG. 3, having a selected location, preferably at the main banking headquarters. When a master control station is not integrated into the system shown in FIG. 1, the alternate equipment described for unit 15 will be used. Thus, FIG. 1 represents the various components present at an unmanned station 2 and a remote central control station 1 for conducting automatic banking transactions in the absence of bank personnel and with maximum protection for the stored money supply in money vault 12 from which cash is dispensed to a customer.

The automatic equipment and system may be installed as illustrated and described; or it may be combined with various types of banking equipment which are and have been used, either as a part thereof in new installations, or by supplementing present installations with the new automatic banking system components.

For example, the automatic system and equipment may be used as a part of typical visual auto-teller equipment, with direct visual communication between a teller 35 inside a banking building, such as indicated at station 1 and a customer 38 at station 2. In this instance, during manual operation and control by the teller, there may be intercom facilities indicated at 36 and 37 at stations 1 and 2, and the banking transactions are carried out between the customer 38 at station 2, and a teller 35 at the teller station 11, through the use of the pneumatic tube system 8 between the control station terminal 22 and the customer station terminal 7, the terminal 22 thus serving as a teller terminal during manual operation. During such manual operation, the teller keyboard 20 and display panel 21 may be used for communication between the customer and teller.

Instead of direct visual communication between the customer 38 and the teller 35, there may be visual television communication using conventional equipment, such as a closed circuit television system having TV screens 39 and 40, respectively, at the teller station 11 and customer station 2. In either instance, the station 2 may be a part of a drive-up banking unit located at a drive-in island outside of a bank building, or of a walk-up unit at a banking facility. Alternately, the improved automatic banking equipment may be installed for customer access at drive-up or walk-up windows, normally serviced through deal drawers and the like, for use when such windows are unmanned.

The typical visual auto-teller equipment, the visual television communication by closed circuit television between screens 39 and 40 and typical customer access drive-up or walk-up windows, normally serviced through deal drawers, referred to, may be of types shown in U.S. Pat. Nos. 3,237,881, 3,237,882, 3,237,933, 3,237,853 and 3,429,082.

Regardless of the type of manually served banking equipment with which the new automatic equipment is associated or integrated, automatic operation is prevented during manual operation when the manual control button 32 is energized; and automatic operation is initiated by an operator actuating automatic button 19 which switches the unmanned station 2 to automatic operation.

The automatic mode of operation utilizes the components described, and a customer 38 at station 2 may complete a transaction by entering the necessary information at the keyboard 3 and card reader 4, as instructed. When the customer's identity has been verified, the amount of money involved in the transaction is delivered to the customer from the money vault 12 by way of the vault-tube conveyor 13 and to the dispenser carrier 23 preferably normally located at the control station 11 and through pneumatic tube 8 to the dispenser terminal door 7 where the money may be removed by the customer 38 from the carrier 23 delivered at the door 7.

When the central control facility station 1 is connected through line 34 with a master control station integrated in the system, and there is loss of a telephone circuit to the master control station, automatic dispensing of cash at an unmanned station 2 may be continued by the entry by the customer 38 at the keyboard 3 and card reader 4 of his account number and a personal identification number, with limited transactions for any customer.

Figure 4:
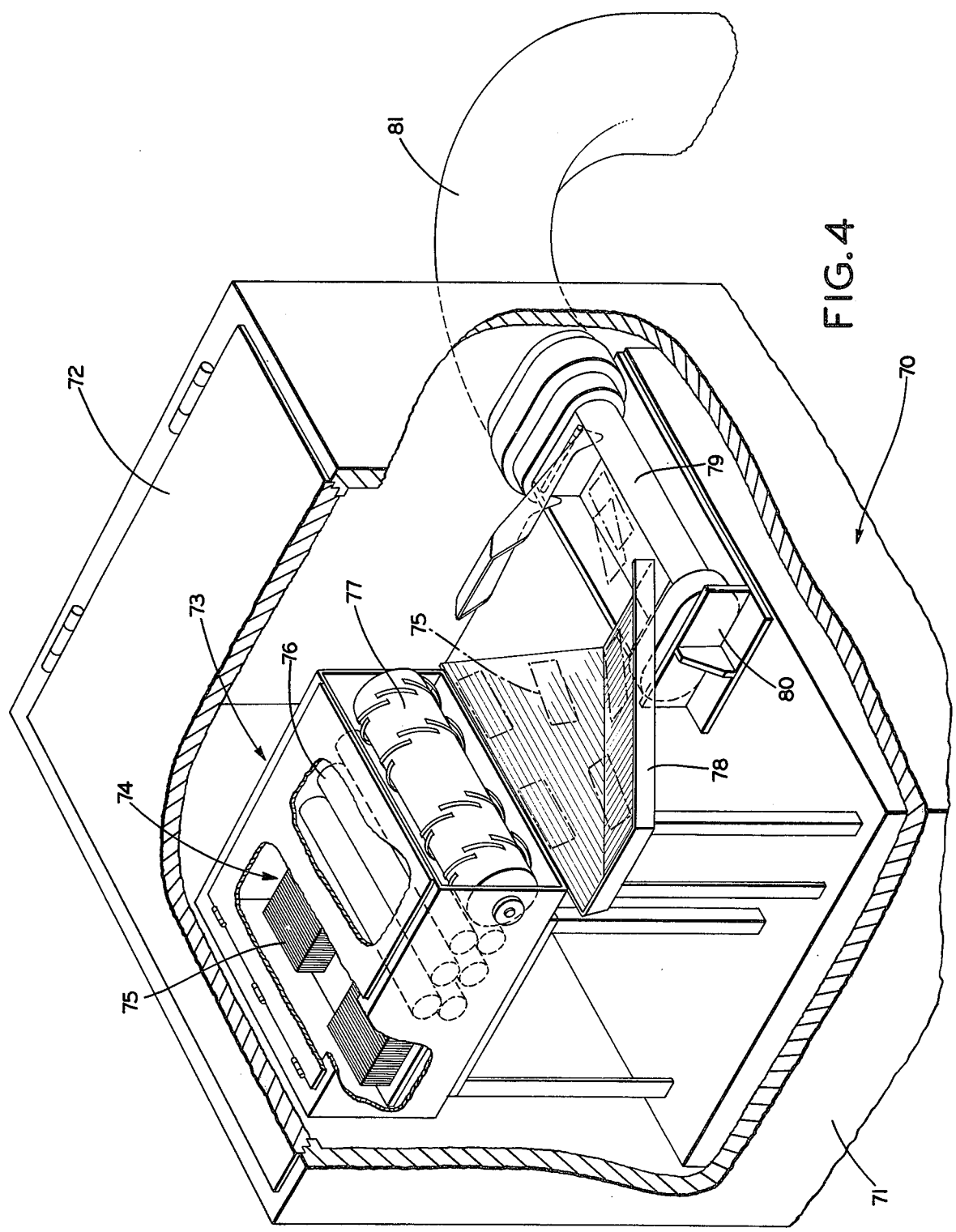
FIG. 4 is a diagrammatic perspective view, with parts broken away, showing a combined vault storage, dispenser and transfer unit containing the components of the money vault unit and vault-tube conveyor, shown in diagram blocks in FIG. 1.
Figure 6:
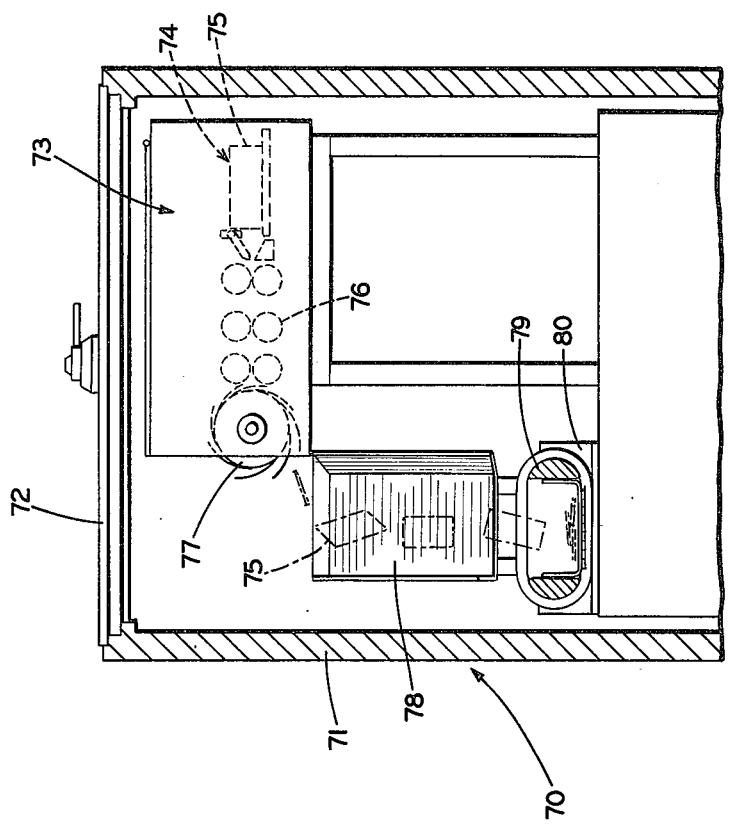
FIG. 6 is a diagrammatic end view of the parts shown in FIGS. 4 and 5.
Figure 5:
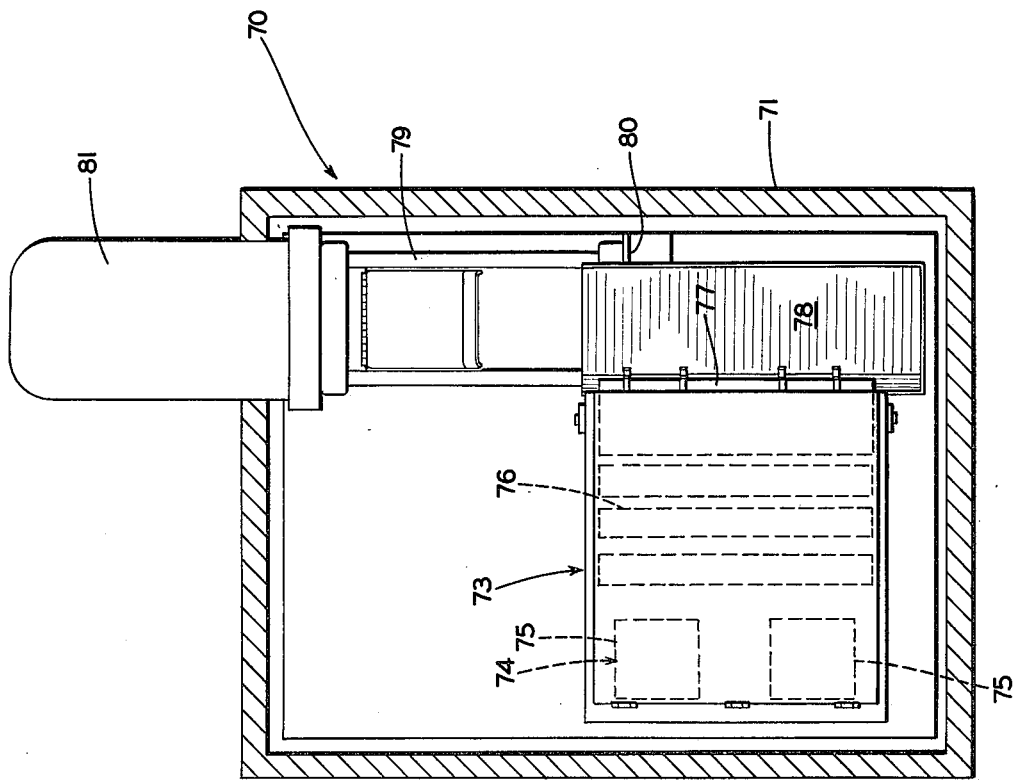
FIG. 5 is a diagramamtic top plan view of certain of the parts in FIG. 4.

The conveyor receive station in the vault-tube conveyor 13, the vault-tube conveyor 13, the vault unit 12, and the control terminal 22 for pneumatic dispenser tube 8 indicated somewhat diagrammatically in FIG. 1, may be combined in a single assembly or storage, dispenser and transfer unit shown in FIGS. 4, 5 and 6, and generally indicated at 70.

The combined currency storage, dispenser and transfer unit 70 may include vault-like walls 71 which function as the walls of the money vault unit 12 and vault tube conveyor 13 shown in blocks in FIG. 1, having a typical vault door indicated diagrammatically at 72. A currency storage and dispenser component, indicated at 73, may be of the general type shown in U.S. Pat. No. 3,760,158 having a currency storage zone 74 which delivers currency indicated at 75 from the stored supply to a receive zone of conveyor means 76 and then to a conveyor feed roll 77 from which the currency is discharged or transferred onto a chute 78 directing the currency into an open carrier 79 represented diagrammatically at 23 in FIG. 1.

The carrier 79 is delivered to the terminal cradle 80 at the end of a pneumatic tube 81, the terminal cradle 80 being indicated diagrammatically in FIG. 1 by the control terminal numeral 22 at the end of tube 8 connecting the remote station 2 with the teller station 11. Carrier 79 may be a usual oval banking system carrier of the type shown in U.S. Pat. No. 3,237,884, and the control and manipulation of the carrier 79 when arriving at or being discharged from the terminal cradle 80, may be actuated and controlled in a usual manner as in U.S. Pat. Nos. 3,237,881, 3,237,882 and 3,237,933.

The activation of the currency storage and dispenser component 73 is controlled in response to keying in the amount of money that the customer seeks to withdraw after identification and verification, at the remote station keyboard 3. The keyboard 3 comprises the actuating keyboard of the cash dispensing apparatus of U.S. Pat. No. 3,760,158.

Second Embodiment

Figure 2:
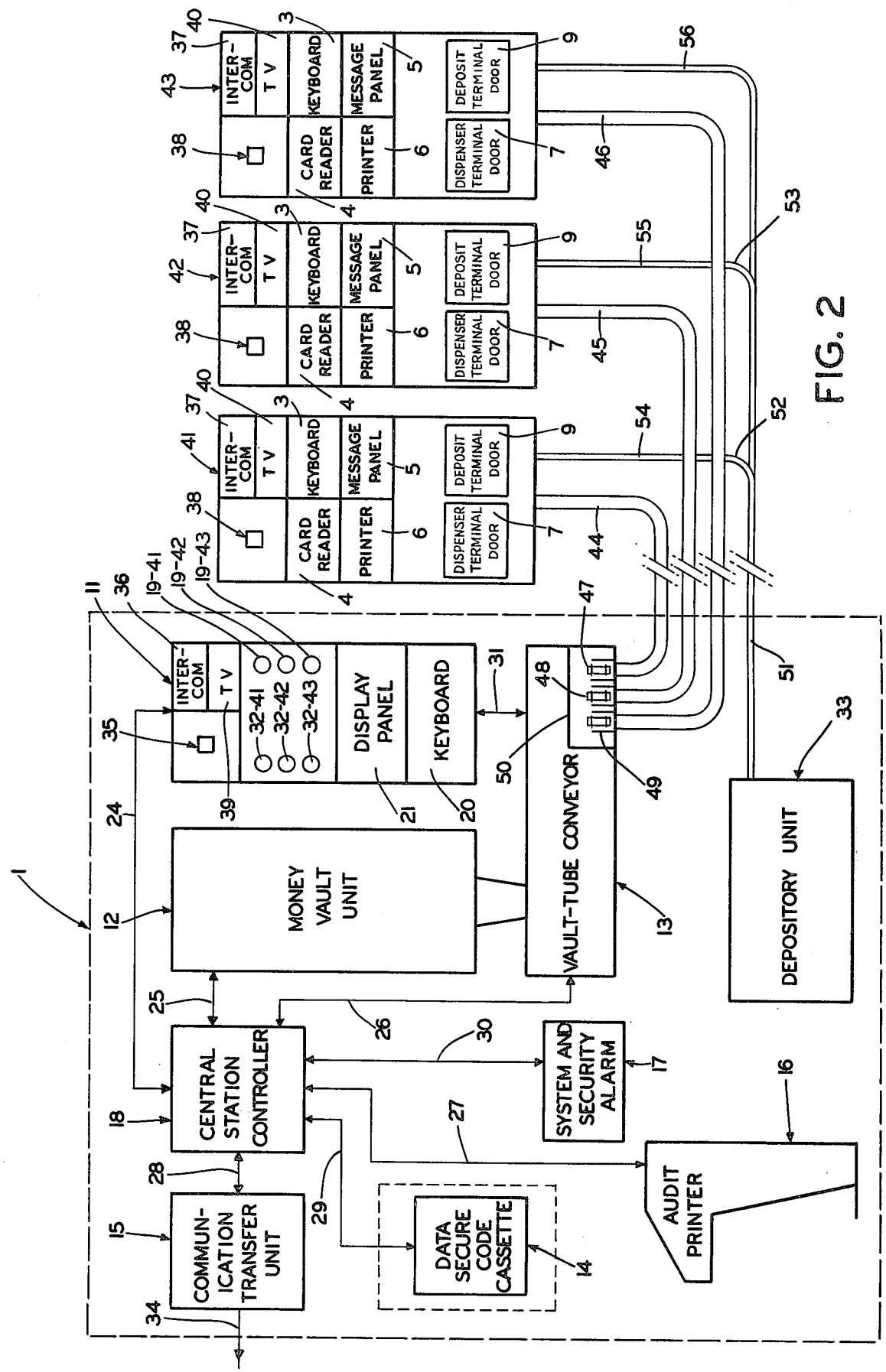
FIG. 2 is a view similar to FIG. 1 of another block diagram illustrating the new systems, equipment and operations, with several customer stations serviced from one bank central control station.

The system, equipment, etc., illustrated in FIG. 2 is the same as that illustrated and described in connection with FIG. 1, excepting that there are a number of unmanned customer stations 41, 42 and 43 served and controlled by the central control station 1, three being shown in FIG. 2.

Each unmanned station 41, 42 and 43 of FIG. 2 has the same components as those present at the unmanned station 2 of FIG. 1. Each of the stations 41, 42 and 43 may be associated with, combined with, supplemented with or installed as a part of the various walk-up, drive-up, direct-visual or television-visual banking equipment arrangements described in connection with the unmanned station 2 of FIG. 1.

Individual controls for each of the unmanned stations 41, 42 and 43, are located at a teller station 11. Automatic buttons 19–41, 19–42 and 19–43 are provided, respectively, for placing any selected unmanned station 41, 42 or 43 into automatic operation. Similarly, manual buttons 32–41, 32–42 and 32–43 are provided at teller station 11, respectively, for the stations 41, 42 and 43, when the stations are equipped for manual operation, for placing any unit under manual control.

There is a separate pneumatic dispenser tube 44, 45 and 46, respectively, for each unmanned station 41, 42 or 43, as shown. An individual captive carrier 47, 48 and 49 travels, respectively, in each of the pneumatic tube systems 44, 45 and 46. The carriers 47, 48 and 49 may arrive, as shown in FIG. 2, at the control tube terminal station 50 during manual operation. At this station 50, money to be dispensed is delivered selectively to carrier 47, 48 or 49 by the vault-tube conveyor 13, as determined by the unmanned station 41, 42 or 43 to which the money is to be delivered.

Alternately, a carrier diverter mechanism may be installed at control tube terminal 50 to direct any carrier 47, 48 or 49 to a transfer station within the vault-tube conveyor 13. The cash to be dispensed is transferred at such transfer station from the conveyor 13 to the particular carrier for the unmanned station 41, 42 or 43 involved.

The depository unit 33 may be served by a common pneumatic tube 51 connected by diverters 52 and 53 with branch tubes 54 and 55 respectively, for stations 41 and 42, and a terminal branch 56 is provided for station 43.

Any of the pneumatic tube diverters 52 or 53 or those referred to as being installed in the control tube terminal 50 to direct any carrier 47, 48 or 49 to a transfer station may be of a type of pneumatic tube diverter for example, as shown in U.S. Pat. Nos. 3,701,496, 3,762,664 and 3,774,863.

The other components at the central control facility station 1 are coordinated with and are integrated in the systems for the operation of each of the unmanned customer stations 41, 42 and 43, as described in connection with the operation of the automatic banking system illustrated in FIG. 1.

Third Embodiment

Figure 3:
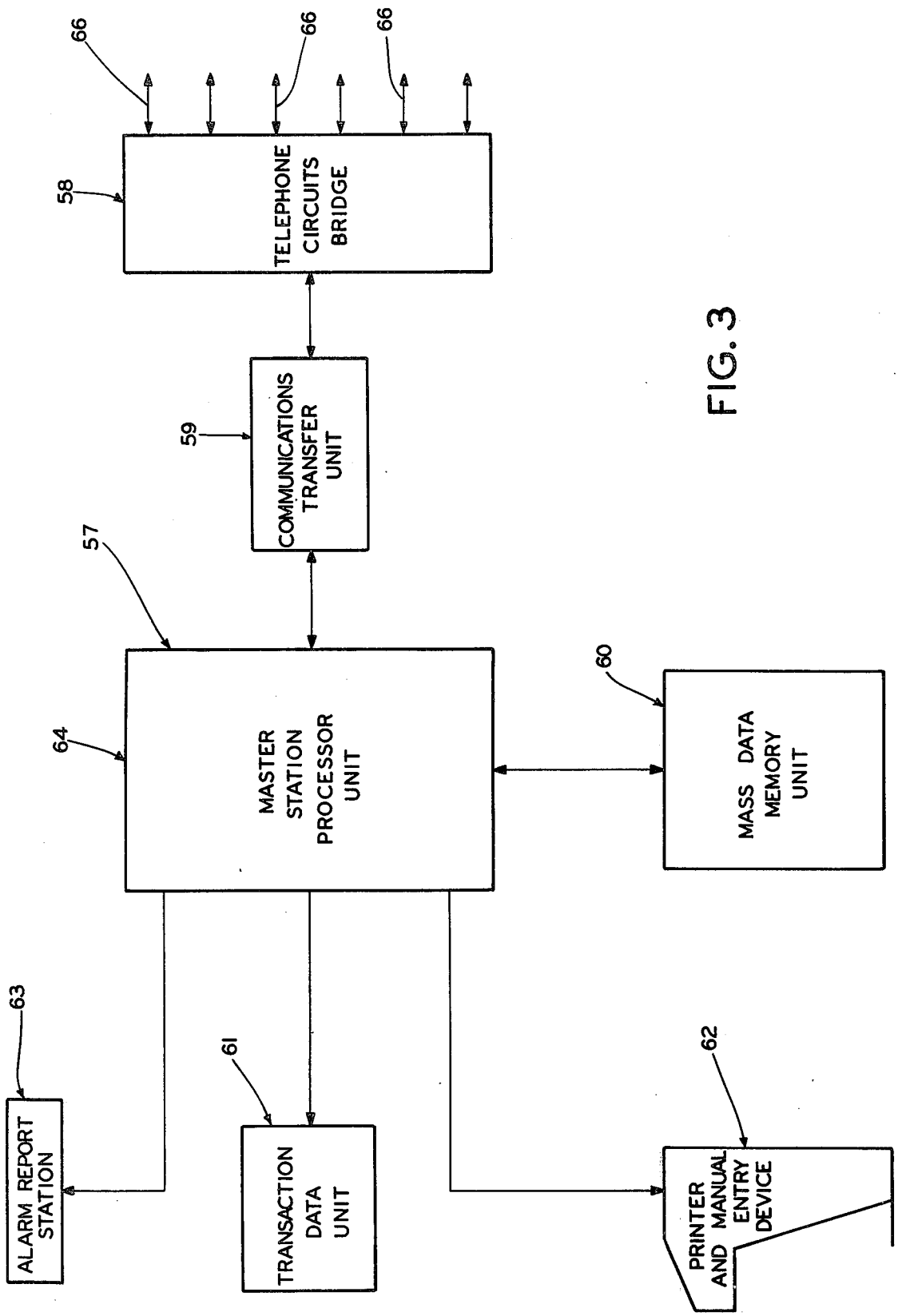
FIG. 3 is another block diagram of a master control station serving several bank central control stations, such as illustrated in FIGS. 1 or 2.

FIG. 3 diagrammatically indicates equipment at a master control station 57 located at the banking headquarters of a bank and which controls the operation of a number of remote central control facility stations 1, each of which in turn may control a number of unmanned customer stations 2.

The master control station 57 is used as a matter of economics to permit decision-making and reporting equipment simultaneously to service a large number of central control stations 1.

The master control station unit 57 has a number of components including a telephone circuits bridge 58, a communications transfer unit 59, a mass data memory unit 60, a transaction data unit 61, a printer and manual entry device 62, an alarm reporting station 63, and a master station processor unit 64.

The telephone circuits bridge 58 is provided to permit data transfer to and from many central control stations 1 over telephone lines or leased or owned data circuits. A number of lines are indicated by the arrows 66 in FIG. 3, and each of the lines 66 is connected to a separate central control station 1. Thus, one of the lines 66 of FIG. 3 may connect with the line 34 of FIGS. 1 or 2.

The communications transfer unit 59 is an interface unit provided to permit data transfer to and from the master station processor unit 64 to enable data transmission to and from all connected central control stations 1.

The mass data memory unit 60 is provided for the storage of all data requirements for processing transaction data requested from the central control stations 1 that are integrated with the master control station 57.

In addition to transaction data, the mass data memory unit 60 contains other information such as cryptographical data to assure protection of the equipment, valuables and personnel involved in any transaction.

The transaction data unit 61 is provided for storing transaction data for reporting such data to the bank's primary accounting and control machine.

The printer and manual entry device 62 is provided to record the system operation data, and an audit trail of transaction data, alarm data and other data concerning pertinent information. The printer and manual entry device 62 includes a keyboard and a tape reader to permit manual entry into the system of data for maintaining current and proper operation of the system.

The alarm reporting station 63 is an interface unit permitting transfer of alarm data, which may be received from central control stations 1, or from the master control station 57, to appropriate alarm circuits communicating with security personnel.

The master station processor unit 64 is a master control for the total system. The communications transfer unit 59, the mass data memory unit 60, the transaction data unit 61, the printer and manual entry device 62, and the alarm reporting station 63 are controlled by the processor unit 64. In addition, all central control stations 1, connected with the master control station 57 are dependent upon the processor unit 64 for operation. The unit 64 contains electronic devices and circuits and programming means to perform the functions described.

IN GENERAL

The various systems shown in FIGS. 1, 2 and 3 provide single or multiple unmanned station units connected with a central control station or stations which in turn may or may not be connected with a master control station so that automatic banking transactions may be conducted at any of the unmanned stations in the system at any time without requiring attendance of banking personnel, and while safeguarding the store of cash maintained at central control stations under secure conditions.

Any transaction is initiated by a customer entering a personal identification number and other data about the transaction into a keyboard 3 and card reader 4 or entering other customer identifying means at any station 2 and following instructions given at the message panel 5 at any station. The system at any station, of course, must be energized for automatic operation by actuation of an automatic button such as 19 controlling the energizing of automatic operation for a particular station 2 coordinated in the system with the switch actuated by the button.

Accordingly, the concept of the invention provides systems, equipment and operations by which cash may be dispensed at an unmanned station from a money vault unit located at a remote station to a customer at the unmanned station who there verifies his identity. The systems may accept deposits from the customer which are conveyed to a depository at a remote station for safe-keeping. Any unmanned station may be combined with existing drive-up or walk-up banking equipment now served by banking personnel; or may be combined and installed along with such equipment, or with visual teller and television teller banking equipment communicating between the customer and teller through pneumatic tube systems.

Stated in other terms, the new concept of the invention comprehends a remote unattended customer station where a customer on entering identification and transaction data into a keyboard, may receive money in response to such data entry being verified, without the necessity of teller intervention, and characterizeably dispensing the money from a store of money located remotely from a customer station so that the money supply is protected from attack that could be carried out by robbers at the remote customer station if the supply of money is stored at that remote location.

Thus, the improved systems, equipment and operations achieve the objectives stated, eliminate difficulties either of safekeeping of cash supplies or of requiring banking personnel, which have existed in prior art banking systems, and solve problems and obtain the new results described.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the systems and equipment are assembled, combined and operated, and the advantageous, new and useful results obtained; the new and useful structures, devices, elements, arrangements, parts, combinations, systems, equipment, operations and relationships are set forth in the appended claims.

We claim:

1. In remote banking equipment of a type which includes a customer station and a remote bank control station; in which the customer station has keyboard means, card reader means, and message panel means; in which communication means connects the customer and control stations; and in which a customer may enter identification and transaction data and material into the keyboard and card reader, and upon verified identification may receive at a customer station dispenser terminal a selected amount of currency determined by the transaction data keyed-in at the keyboard; the combination, including a pneumatic tube system connecting the customer station dispenser terminal and the control station forming a component of said communication means; the tube system having a control terminal at the control station; a carrier movable in the pneumatic tube system between the control and dispenser terminals; vault means located at the control station containing and storing a supply of currency; the -vault means including currency delivery and conveyor means communicating between the currency supply and a control-terminal-located carrier for transferring selected amounts of currency from the currency supply to such control-terminal-located carrier; switch means at the control station movable to energize the customer and control stations for automatic unmanned operation; controller means including circuitry operatively connected between the customer and control stations and operative upon verified customer identification and entry of identification and transaction data at the customer station keyboard and card reader in accordance with instructions at the message panel means to actuate the currency delivery and conveyor means to deliver a selected amount of currency to a control-terminal-located carrier determined by the transaction data keyed-in at the keyboard; and said pneumatic tube system being operative upon delivery of said selected amount of currency to said control-terminal-located carrier to move the carrier from the control terminal to the dispenser terminal at the customer station.

2. The equipment defined in claim 1 in which the currency delivery and conveyor means has a currency receive zone and feed roll; in which the currency delivery and conveyor means when actuated delivers the selected amount of currency from the currency supply to the feed roll; and in which the feed roll discharges the currency to the control-terminal-located carrier.

3. The equipment defined in claim 1 in which the carrier is a captive carrier; in which a carrier terminal cradle is located at the control terminal; and in which the carrier is normally located on said cradle.

4. The equipment defined in claim 1 in which the communication means includes a depository unit located at the control station, a deposit terminal located at the customer station separate from the dispenser terminal, and a deposit pneumatic tube system connecting the depository unit and deposit terminal.

5. The method of protecting currency dispensed at an unmanned customer station in remote banking equipment of a type in which a customer station is served from a remote central control facility station; the steps of providing keyboard, card reader and message panel means at a customer station; connecting the customer and central control stations with pneumatic tube means having a terminal at each station; providing a supply of currency at the control station; enclosing the control station currency supply within vault means; locating the pneumatic tube control terminal within the vault means; delivering a selected amount of currency from the currency supply in the control station vault means to the pneumatic tube control terminal and through the pneumatic tube means to the customer station; and initiating the delivery of currency from the currency supply to the customer station by entering identification and transaction data into the keyboard and card reader means and verifying such customer identity at the control station.

6. The method of protecting currency dispensed at an unmanned customer station in remote banking equipment of a type in which a customer station is served from a remote central control facility station; the steps of providing keyboard, card reader and message panel means at a customer station; connecting the customer and central control -stations with transport means having a terminal at each station; providing a supply of currency at the control station; enclosing the control station currency supply within vault means; locating the transport means control station terminal within the vault means; delivering a selected amount of currency from the currency supply in the control station vault means to the transport means control station terminal and through the transport means to the customer station; and initiating the delivery of currency from the currency supply to the customer station by entering identification and transaction data into the keyboard and card reader means and verifying such customer identity at the control station.

* * * * *